US008136991B2

(12) United States Patent
Will et al.

(10) Patent No.: US 8,136,991 B2
(45) Date of Patent: Mar. 20, 2012

(54) INFANT CAR SEAT SUSPENDED BAG

(76) Inventors: Rebecca Will, Ottawa (CA); D. Gregory Gallo, Ottawa (CA)

( * ) Notice: Subject to any disclaimer, the term of this patent is extended or adjusted under 35 U.S.C. 154(b) by 951 days.

(21) Appl. No.: 12/133,459

(22) Filed: Jun. 5, 2008

(65) Prior Publication Data
US 2009/0304306 A1 Dec. 10, 2009

(51) Int. Cl.
B65D 33/06 (2006.01)
B65D 33/14 (2006.01)
B60R 7/00 (2006.01)
A45C 15/00 (2006.01)
A45F 4/00 (2006.01)

(52) U.S. Cl. ............... 383/6; 383/22; 383/67; 224/409; 224/584

(58) Field of Classification Search ............... 383/6, 10, 383/11, 16, 21, 25, 67, 84, 124, 12, 13, 22; 224/186, 196, 254, 275, 409, 411, 607; 206/466; 446/227; 297/188.01, 219.12, 184.13
See application file for complete search history.

(56) References Cited

U.S. PATENT DOCUMENTS

| | | | | |
|---|---|---|---|---|
| 1,017,721 A * | 2/1912 | Williams | ................. | 232/43.1 |
| 1,708,906 A * | 4/1929 | Sparks et al. | ................. | 224/409 |
| 3,085,610 A * | 4/1963 | Vardan | ................. | 206/526 |
| 4,722,713 A * | 2/1988 | Williams et al. | ................. | 446/227 |
| 4,805,937 A * | 2/1989 | Boucher et al. | ................. | 280/33.992 |
| 4,997,231 A * | 3/1991 | Smith | ................. | 297/184.13 |
| D323,933 S * | 2/1992 | Johnston | ................. | D12/416 |
| 5,397,171 A * | 3/1995 | Leach | ................. | 297/484 |
| 5,702,039 A * | 12/1997 | Olaiz | ................. | 224/409 |
| 5,730,490 A * | 3/1998 | Mortenson | ................. | 297/184.13 |
| 5,961,018 A * | 10/1999 | Abelbeck et al. | ................. | 224/584 |
| 6,606,768 B2 * | 8/2003 | Henry et al. | ................. | 24/306 |
| 6,766,930 B2 * | 7/2004 | Dixon et al. | ................. | 224/409 |
| 6,966,472 B2 | 11/2005 | Szarek | | |
| 7,284,790 B1 * | 10/2007 | Brewer | ................. | 297/184.13 |
| D571,412 S * | 6/2008 | Awald-Stafford | ................. | D21/465 |
| 2002/0056736 A1 * | 5/2002 | Conte | ................. | 224/407 |
| 2007/0228094 A1 * | 10/2007 | Bednarz | ................. | 224/407 |

* cited by examiner

*Primary Examiner* — Nathan J Newhouse
*Assistant Examiner* — Nina Attel
(74) *Attorney, Agent, or Firm* — Weingarten, Schurgin, Gagnebin & Lebovici LLP

(57) ABSTRACT

A bag for removably attaching to, and suspending from, the handle of an infant car seat. The bag comprises a compartment shaped to fit within the shape of the handle. The compartment is joined to at least one securing member. The securing member is for attaching the compartment to the handle and comprises at least one suspending portion and at least one steadying portion. The suspending portion is for suspending the compartment from the handle and within the shape of the handle. The steadying portion is to prevent the compartment from swinging from the handle. The suspending portion can be integral with the steadying portion.

12 Claims, 4 Drawing Sheets

INFANT CAR SEAT SUSPENDED BAG

FIELD OF THE INVENTION

The present invention relates generally to detachably suspended bags. More particularly, the present invention relates to bags that can be removably attached to, and suspended from, the handles of infant car seats.

BACKGROUND OF THE INVENTION

Infant car seats have evolved in such a way that an infant can be clipped safely into the seat, which can then be attached to a regular car seat, stroller frame or shopping cart, or carried by hand. In this manner, it is possible to avoid disturbing the child when moving from, for example, a car to a stroller. As a result of the extended use of infant car seats, children are spending an increasing amount of time in this one space, making it an important developmental environment. In addition, advances in infant car seats, coupled with the increased complexity of family life, have made it the safe and convenient method of transporting and storing infants. The extended time infants spend in car seats gives rise to a dilemma: while it is convenient to keep infants in the car seat for extended periods of time, it is also desirable that they have a stimulating and fun place to play as well as a safe and soothing place to rest and sleep.

This dilemma gives rise to a practical question: How can one keep the infant entertained in the same environment yet allow the infant the tools for proper development? Infants do not keep track of the toys they are given. This has led to the invention of products that are designed to attach toys to an infant car seat or a handle.

U.S. Pat. No. 5,702,039 (Oliaz) discloses an apparatus for securing toys and other items to the handle of a stroller. However, the apparatus does not provide any means for storing the items, which would prevent the items from swinging around. Unstored items may hit the infant or get in the way when the infant is removed from the infant car seat.

While Oliaz solves the problem of losing toys, the apparatus presents other problems. One problem is that, when the infant seat is moving and comes to a sudden stop (for instance, while driving) or is tipped when the seat is transferred from car to carriage to hand, dangling toys can create noise and can swing around and hit the infant. Also, when infants are falling asleep, they often jerk and hit the swinging toys, which then make noise and wake the infant. Being hit by the toys is not only unpleasant for the infant, it often disturbs its sleep. It is also frustrating for an adult to have to negotiate around hanging toys as one tries to remove an infant from its car seat. The toys can get tangled with the infant's arms or hit them in the face. Although the toys can be detached, this can be time-consuming and noisy and may disturb the infant. If removed, the toys would need to be stored somewhere that will not be forgotten and reattached for the next outing.

Bags for securing toys, and bags attached to handles, have been described previously; the disclosed bags, however, are not designed to fit within the natural space of the infant car seat. The bags can swing and hit the infant, or can accidentally shift to cover the infant. U.S. Pat. No. 5,961,018 (Abelbeck) describes a bag that attaches to a handle of a shopping cart. The disclosed bag is meant for storing items commonly taken shopping and is comprised of at least one flap and a pliable portion capable of flexing around and fastening to the handle of the shopping cart. Although Abelbeck describes a tether to secure a pillow to the bag, Abelbeck only states that the pillow can be a foldable item such as a blanket or towel. Abelbeck does not disclose securing toys in order to prevent them from being lost. Further, the bag disclosed by Abelbeck would swing back and forth on the handle and is not described as hanging above an infant.

U.S. Pat. No. 6,966,472 (Szarek) describes a bag hung around an adult's neck that stores toys or other items when not in use. The toys can be removed from the bag and suspended from the bag for the infant's enjoyment. The bag, as disclosed, requires the user to be near the infant. Even if the bag is attached to an infant car seat, the bag would likely, however, swing freely and potentially hit the infant. Toys can also get in the way when the adult leans in to pick the infant out of the car seat.

U.S. Pat. No. 3,085,610 (Vardan) describes a toy carrier designed to prevent toys from falling on the floor and being contaminated. The carrier is described to have adjustable straps so that it can be attached to a purse, a high chair, a carriage, the side of a crib, etc. The toys held in the carrier are secured to the bag using relatively short leashes which are attached to a bar extending traversely across the interior of the bag. In use, the carrier is attached to a crib, a high chair or any locality where it is desirable to have toys available to the baby. Once secured, the bag is opened and the toys are allowed to hang down from the bar. For transportation or storage, the toys can be placed in the carrier and the carrier closed. Vardan does not, however, disclose means for securing the toy carrier to a handle such that the bag is prevented from swinging in the attached condition.

It is, therefore, desirable to provide a bag that is firmly fixed within the shape of the handle of an infant car seat, and which still allows for an adult to comfortably grasp the car seat handle.

SUMMARY OF THE INVENTION

It is an object of the present invention to obviate or mitigate at least one disadvantage of previous bags that can be attached to, and suspended from, infant car seats.

In a first aspect, the present invention provides a bag for removably attaching to, and suspending from, the handle of an infant car seat. The bag comprises a compartment shaped to fit within the shape of the handle. The compartment is joined to at least one securing member. The securing member is for attaching the compartment to the handle and comprises at least one suspending portion and at least one steadying portion. The suspending portion is for suspending the compartment from the handle and within the shape of the handle. The steadying portion is to prevent the compartment from swinging from the handle. The suspending portion can be integral with the steadying portion.

The compartment can also include an inside portion and a closeable opening through which the inside of the compartment can be accessed. The compartment can include a face opposite from the handle, the opposite face being defined when the bag is attached to the handle, and the closeable opening can be on the opposite face.

The bag can also include tethering means for tethering a toy or other object to the compartment. The toy or other object can be tethered inside the compartment. The tethering means can comprises a hook, a loop, a clip, Velcro, a grommet or an eyelet. The tethering means can further include an attaching means for attaching the toy or other object to the tethering means.

The bag can further comprise a gripping portion. The securing member further can comprises a soft, spongy, elastic or non-slip material. The material can be neoprene.

The suspending portion can include at least one clip, rope, hook, strap, portion of Velcro or magnet. The steadying portion can include at least one clip, rope, hook, strap, portion of Velcro or magnet.

The bag can also include at least one belt for steadying the bag during attachment and removal of the bag from the handle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a system for securing a bag to, and suspending it from, a handle of an infant car seat such that the bag does not swing back and forth.

Figure 1:
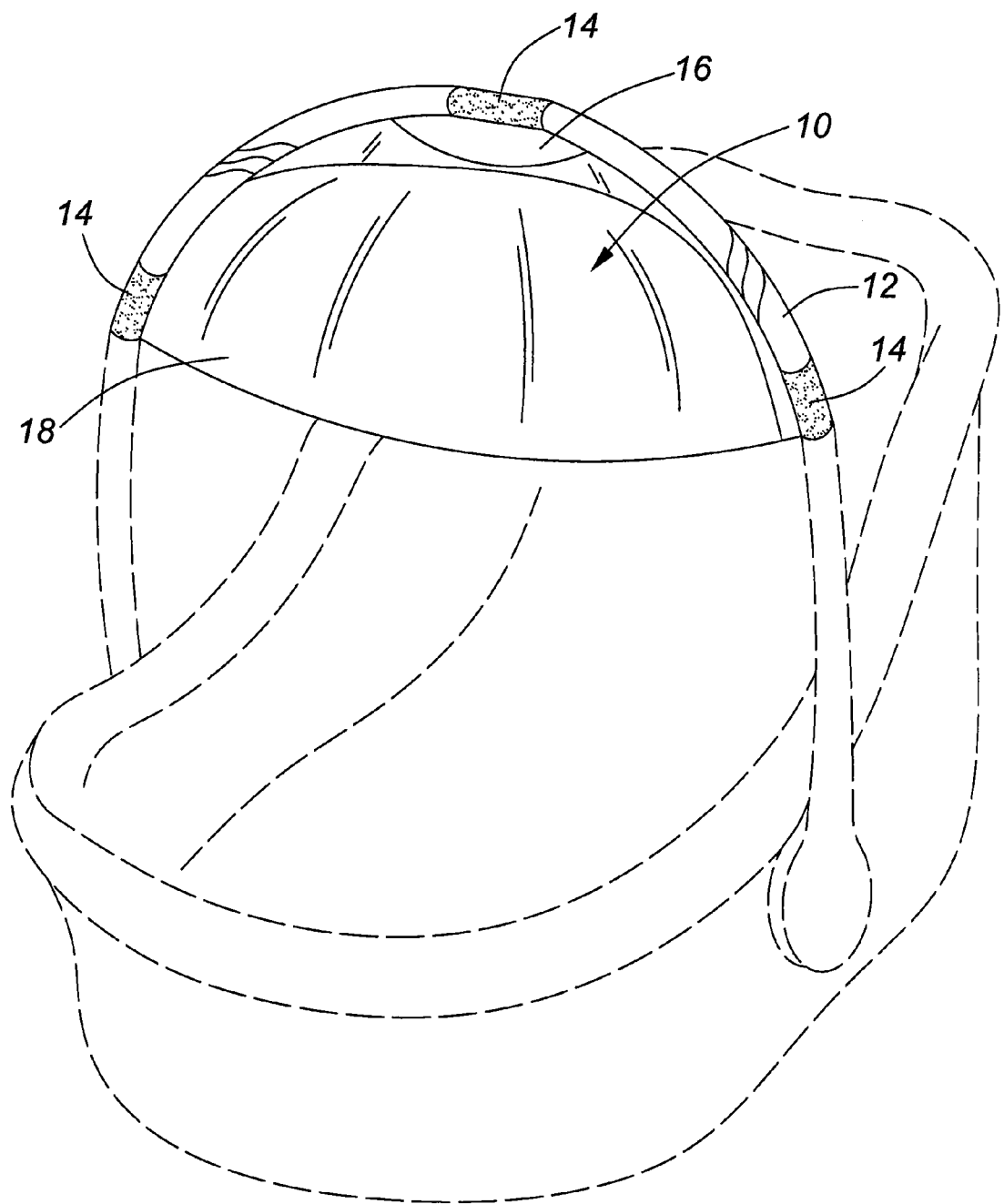
FIG. 1 is a perspective view of a bag attached to a handle of an infant car seat.
Figure 2:
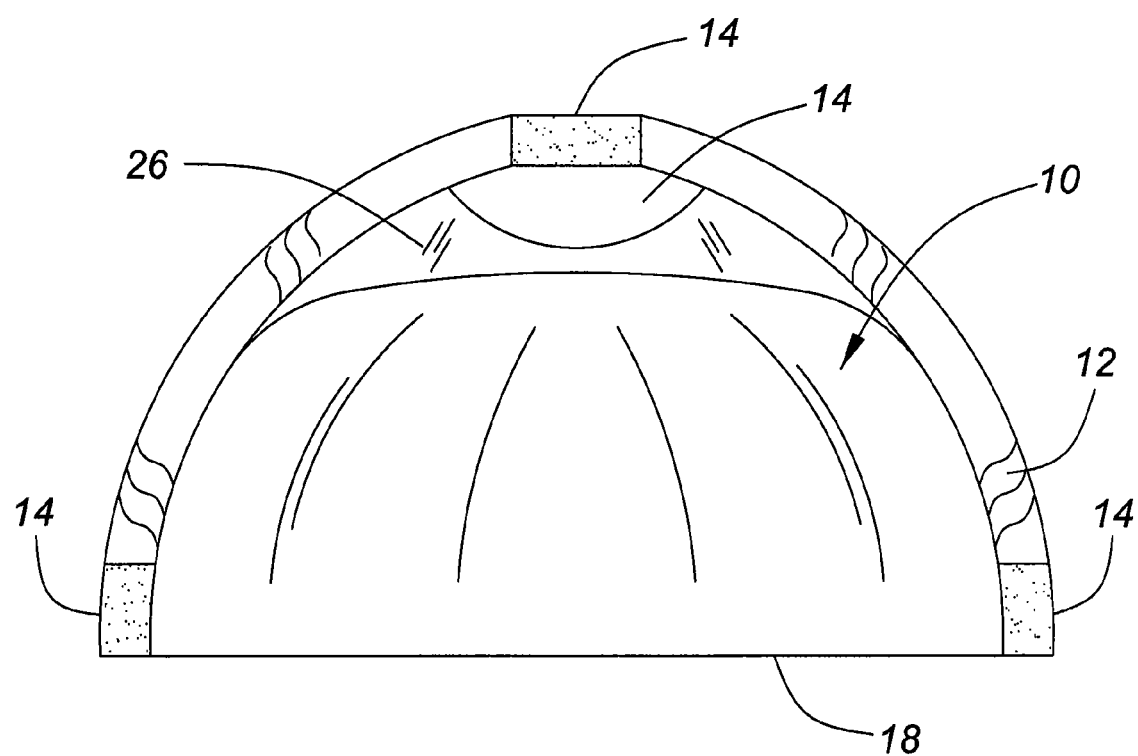
FIG. 2 is a front view of the bag.
Figure 3:
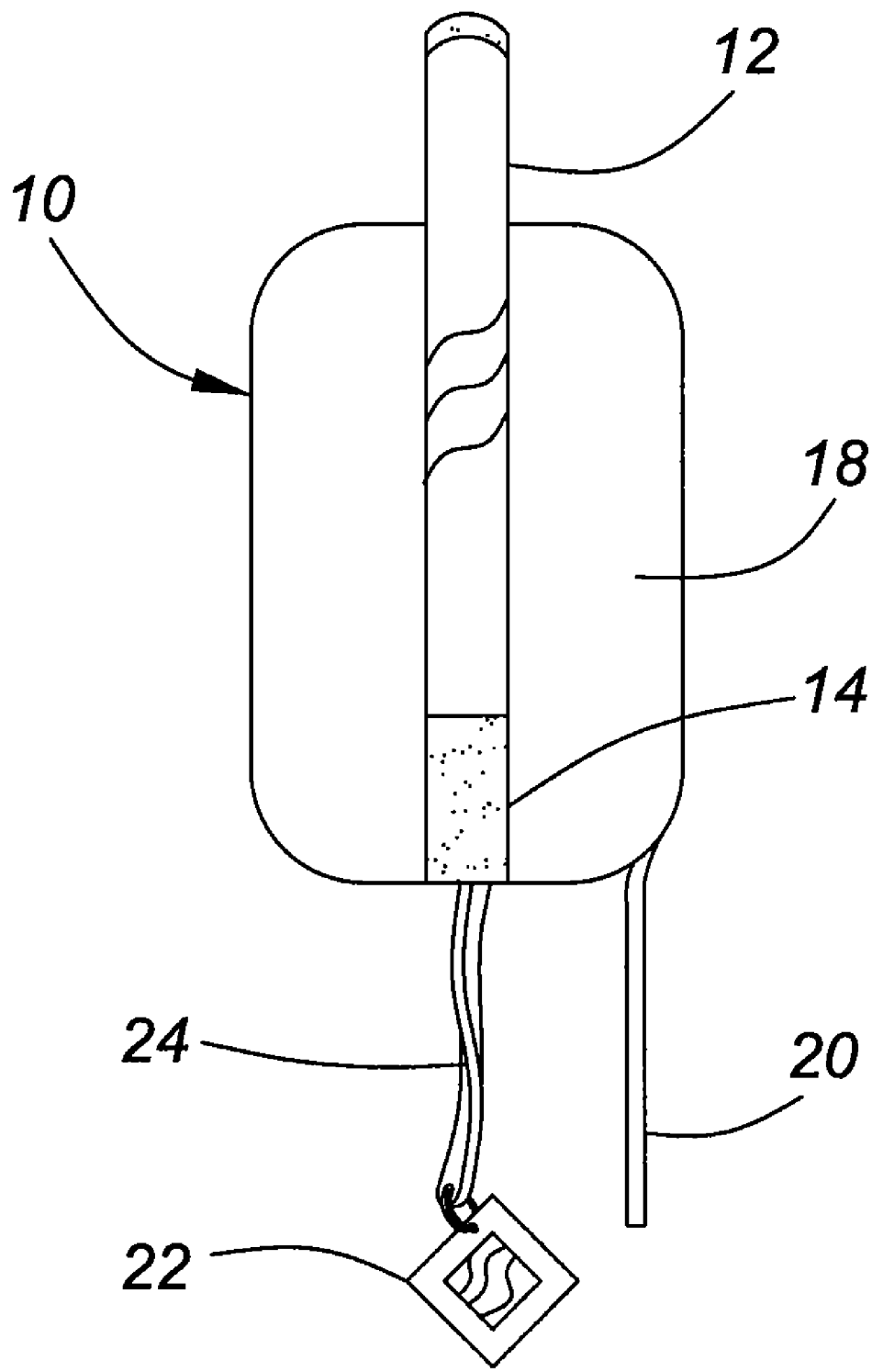
FIG. 3 is a side view of the bag.
Figure 4:
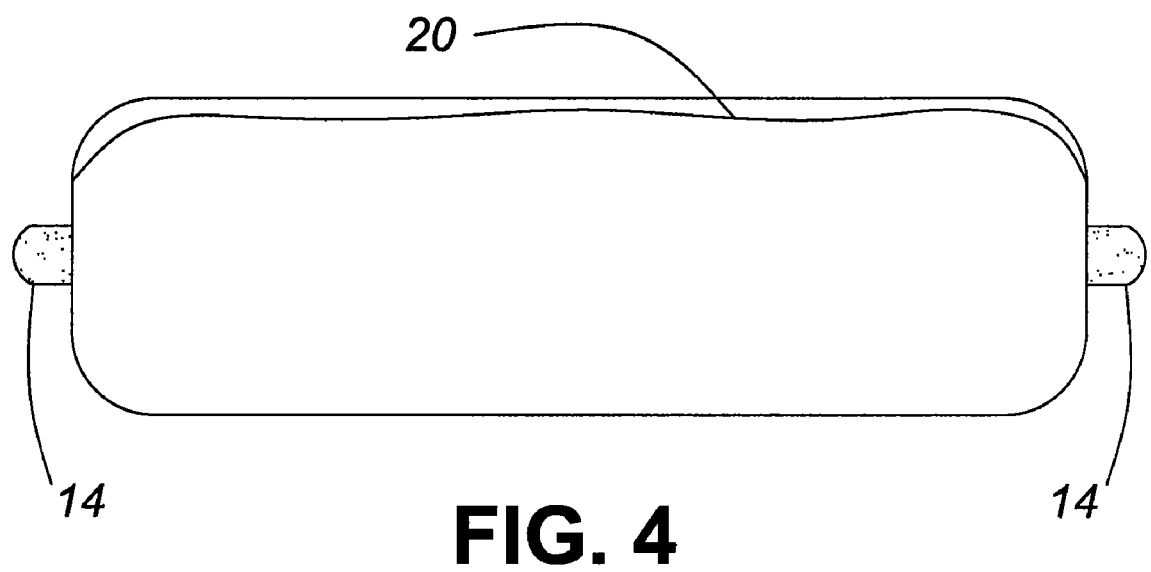
FIG. 4 is a bottom view of the bag.

One embodiment of the present invention is shown in FIGS. 1-4. A bag 10 is shown with a handle attachment member 12 that can be removably attached to an arched infant car seat handle. FIGS. 1-3 also show belts 14, an optional feature of the invention. The belts 14 steady the bag 10 and the handle attachment member 12 during attachment to, and removal from, the infant car seat. The handle attachment member 12 can be any material that can fit around the infant car seat handle, but is preferably a soft, spongy, elastic, non-slip material. More preferably, the material is neoprene. The attachment member 12 and belts are preferably sized to allow a person to grasp and carry the infant car seat when the bag 10 is attached to the handle.

In the embodiment shown in FIGS. 1-3, the handle attachment member 12 is disclosed to be one continuous covering that covers the infant car seat handle over a substantial portion of the handle's arch. It would be understood by a person of skill in the art that this single covering engages the handle at multiple points. The handle attachment member 12 can alternatively comprise more than one covering. In such alternate embodiments, not shown, a bag having two coverings could be secured to the infant car seat handle when the coverings are generally opposite each other and cover a substantial portion of the handle's arch. These coverings also engage the handle at multiple points. In a bag with three or more coverings, also not shown, the coverings can be positioned generally equally spaced apart. In the embodiments with three or more coverings, the coverings also engage the handle at multiple points.

Increasing the number of coverings results in decreasing the amount of the handle's arch that needs to be covered by the coverings in order both to prevent the bag 10 from swinging and to suspend the bag from the handle. It is the engagement at multiple points along the arched handle that suspends the bag 10, while at the same time preventing it from swinging. It would be understood by a person of skill in the art that a covering could work as either a suspending portion or a steadying portion. It would also be understood that a covering could work as both a suspending portion and a steadying portion at the same time.

The handle attachment member 12 shown in FIG. 1 can be secured around the handle with a zipper closure (not shown). Alternate means of securing the handle attachment member 12 to the handle include clips, ropes, hooks, straps, hook-and-loop fasteners, such as that known by the trademark Velcro™, magnetic attachment and any other means known to a person of skill in the art.

The bag 10 shown in FIG. 1-3 includes a cut-out gripping portion 16 sufficiently large to accommodate an adult's hand when the adult carries the infant car seat by the handle. A gripping portion would be understood by one skilled in the art to be a portion of the bag that defines an unrestricted opening around the handle that allows the adult to grip the handle.

The bag 10 includes a compartment 18 for holding toys or other items. Compartment 18 is attached to the handle attachment member 12 such that, when in use, the compartment 18 is fixed within the spaced defined by the inside of the arched portion of the infant car seat handle. The compartment 18 can define a portion of the cut-out gripping portion 16, described above.

The bag 10 can open from the bottom when the bottom flap 20 is opened, as shown in FIG. 3. The bottom of the bag would be understood to be the side of the bag facing the infant and opposite the handle when the bag is attached to the handle. The bottom flap 20 can be flipped up and attached to the outside of the compartment 18 (not shown) using a fastening loop, buckle, button, dome snap or any other attachment means known to one of skill in the art. Although the compartment 18 shown in FIG. 3 is accessed from the bottom using the opening defined by bottom flap 20, the compartment 18 can also be accessed from the side or the top. In various embodiments, the compartment 18 can be accessed by flipping open a flap (as illustrated in FIG. 3), unzipping or pulling apart an opening, or any other method known to one of skill in the art.

The bag 10 can also include a loop (not shown) that can initially secure the bag 10 to the handle even if the bag is not secured by the handle attachment member 12 or belts 14. When the bag 10 is secured by the loop, but not by the belts 14 or handle attachment member 12, the bag 10 can be flipped up and the bottom flap 20 can be opened.

Toys 22 can be kept safely and cleanly in the compartment 18. Preferably, the compartment 18 comprises tethering means which can include short leashes 24 that can be attached to the toys 22 using an attaching means (not shown). The tethering means is typically detachable, but can also include means in which the leashes 24 are permanently attached to the compartment 18. Detachable tethering means can be any means known to one of skill in the art, and is not intended to be limited to hooks, loops, clips, or Velcro™. The toys 22 can also be tethered to the compartment 18 by threading the leashes 24 through grommets or eyelets (not shown) in the compartment 18. The leashes 24 can be of various lengths and can have, at the end, a means for attaching a toy 22. The attaching means for attaching a toy 22 to a leash 24 includes, but is not limited to, hooks, loops and clips. The leashes 24 are typically of sufficient length that the infant can access the toys when the bag 10 is open, but not so long that the toys 22 can reach the ground or wrap around the infant. Different toys can be switched as often as the adult desires and arranged based on such criteria as tether length and child preference. Alternatively, toys can be permanently attached to the end of the leashes 24, and the leash 24 and toy 22 can be swapped on the inside of the compartment. It would also be understood by one of skill in the art that other objects meant to amuse or distract the infant, such a teething rings or suckers, could also be attached to the leashes.

When the compartment is closed, as shown in FIG. 1, the bottom flap 20 can provide a place for attaching relatively flat toys to engage the infant's gaze. Preferably, the bottom flap 20 includes a mirror, soft touchable shapes or a dial. However, any type of soothing, relatively flat toy could be accommodated, including toys with lights or music.

Although not shown in the figures, the outside of the compartment 18 can accommodate various arrangements of pockets. Pockets can also be included at the top of the compartment 18 under the handle attachment member 12 (FIG. 2). The compartment 18 can be comprised of multiple sections (not shown). The sections can be divided within the main compartment in a vertical or horizontal manner. The sections can be accessed from the top or the side of the compartment 18. Separate sections can allow an adult to quickly access an untethered toy stored in a sub-compartment without having to expose all the tethered items.

When the toys 22 are not being used they can be placed into the compartment 18. In embodiments where the leashes 24 are threaded through grommets or eyelets, the toys can be pulled up into the compartment 18 using the ends of the leashes. The compartment 18 can then be closed, thus keeping the toys safe, clean and available for when needed again.

It should be clear that various combinations of pockets, toys and infant items can be devised that differ from the illustrated designs without departing from the nature of the invention. In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. It should be clear that alterations, modifications and variations using different fabrics, methods of closure or means of securing the closure can be effected to the particular embodiments by those of skill in the art without departing from the scope of the invention, which is defined solely by the claims appended hereto.

What is claimed is:

1. A bag for removably attaching to, and suspending from, the handle of an infant car seat, the bag comprising:
   a compartment shaped to fit within the shape of the handle, the compartment comprising walls defining an inner portion and including a face opposite from the handle and directed toward an infant in the car seat when the bag is attached to the handle, an opening formed in the compartment, the inner portion of the compartment accessible through the opening, the walls of the compartment defining a curved arch shape corresponding to the shape of the handle;
   at least one handle attachment member joined to the compartment;
   wherein the at least one handle attachment member is for attaching the compartment to the handle, the handle attachment member comprising a continuous covering having a curved arch shape that removably covers substantially all of the handle, the covering comprising:
   a) at least one suspending portion disposed at an upper region of the compartment for suspending the compartment from the handle and within the shape of the handle; and
   b) at least one steadying portion disposed at a side region of the compartment to prevent the compartment from swinging from the handle;
   a gripping portion comprising a cut out region between the suspending portion of the handle attachment member and the upper region of the compartment, the cut out region sized to permit an adult hand to fit through the cut out region and to grip the handle; and
   a tethering member having one end joined to the compartment at a location within the inner portion of the compartment, the tethering member having an opposite end configured to attach to a toy or other object, the tethering member extending through the opening in the compartment, whereby the toy or object is tetherable to the compartment and suspendable above an infant in the car seat.

2. The bag according to claim 1, wherein the at least one suspending portion is integral with the at least one steadying portion.

3. The bag according to claim 1, wherein the opening further comprises a closeable opening through which the inside of the compartment can be accessed.

4. The bag according to claim 1, wherein the opening is on the opposite face.

5. The bag according to claim 1, wherein the tethering member is detachably joined to the compartment.

6. The bag according to claim 1, wherein the tethering member is selected from the group consisting of a hook, a loop, a clip, hook-and-loop fastener, a grommet and an eyelet.

7. The bag according to claim 1, wherein the tethering member further comprises an attachment member at the opposite end for attaching the toy or other object to the tethering member.

8. The bag according to claim 1, wherein the handle attachment member further comprises a material selected from the group consisting of a soft, spongy, elastic and non-slip material.

9. The bag according to claim 8, wherein the material is neoprene.

10. The bag according to claim 1, wherein the suspending portion is selected from the group consisting of a zipper, clip, rope, hook, strap, portion of hook-and-loop fastener and magnet.

11. The bag according to claim 1, wherein the steadying portion is selected from the group consisting of a zipper, clip, rope, hook, strap, portion of hook-and-loop fastener and magnet.

12. The bag according to claim 1, wherein the bag further includes at least one belt for steadying the bag during attachment and removal of the bag from the handle.

* * * * *